United States Patent
Medina et al.

(10) Patent No.: US 6,712,237 B2
(45) Date of Patent: Mar. 30, 2004

(54) SIMULATED FROZEN BEVERAGE COMPOSITION AND METHOD OF MANUFACTURE THEREOF

(75) Inventors: Augusto S. Medina, Atlanta, GA (US); Roger Whigham, Atlanta, GA (US); John J. Fisher, Alpharetta, GA (US); Barbara Gann, Marietta, GA (US); Kenneth S. Weinaug, Atlanta, GA (US); Richard Staten, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 122 days.

(21) Appl. No.: 10/083,955

(22) Filed: Feb. 27, 2002

(65) Prior Publication Data

US 2002/0172749 A1 Nov. 21, 2002

(Under 37 CFR 1.47)

Related U.S. Application Data

(60) Provisional application No. 60/291,115, filed on May 15, 2001.

(51) Int. Cl.⁷ ................................................. G01F 11/00
(52) U.S. Cl. .............................. 222/1; 222/78; 222/412
(58) Field of Search ........................ 222/1, 129.1–129.4, 222/78, 146.6, 412

(56) References Cited

U.S. PATENT DOCUMENTS

| 5,537,838 A | 7/1996 | Mills et al. .................... 62/400 |
| 5,575,405 A | 11/1996 | Stratton et al. ................. 222/1 |
| 5,588,558 A * | 12/1996 | Cox et al. ...................... 222/64 |
| 5,607,211 A | 3/1997 | Henninger et al. ........... 222/78 |
| 5,715,700 A | 2/1998 | Credle, Jr. .................... 62/390 |
| 5,909,826 A | 6/1999 | Credle, Jr. .................... 222/78 |
| 5,988,441 A | 11/1999 | Weinaug et al. .............. 222/78 |
| 6,059,145 A | 5/2000 | Stratton et al. ................ 222/78 |
| 6,446,835 B1 * | 9/2002 | Ford ............................ 222/56 |

* cited by examiner

Primary Examiner—Joseph A. Kaufman
(74) Attorney, Agent, or Firm—Sutherland Asbill & Brennan LLP

(57) ABSTRACT

Compositions and methods are provided to simulate the appearance of frozen beverages, such as fruit drink slushes or frozen coffees. The composition includes a carrier fluid which comprises water, a thickening agent, and a colorant; and simulated ice crystals stably and uniformly dispersed in the carrier fluid. The simulated ice crystals are comprised of particles, preferably polymeric particles having a size between about 200 and about 400 microns. The thickening agent preferably comprises a slurry of propylene glycol alginate dispersed in propylene glycol. The colorant is selected based on the "flavor" being simulated, for example, yellow for lemonade, caramel color for coffee or cola. The polymeric particles preferably comprise a polymer such as high density polyethylene.

21 Claims, 1 Drawing Sheet

SIMULATED FROZEN BEVERAGE COMPOSITION AND METHOD OF MANUFACTURE THEREOF

CROSS-REFERENCE TO RELATED APPLICATIONS

Priority is claimed under 35 U.S.C. §119 to U.S. provisional application Serial No. 60/291,115, filed May 15, 2001.

FIELD OF THE INVENTION

The compositions and methods described herein are generally in the field of simulated beverages for use beverage dispenser display tanks and bowls.

BACKGROUND OF THE INVENTION

It is known that providing an appealing beverage display bowl in conjunction with a beverage dispenser is a powerful merchandising tool for stimulating impulse buying and increasing beverage consumption and sales.

U.S. Pat. No. 5,575,405 to Stratton, et al. discloses using in a display bowl a fluid simulating the color and texture of the beverage to be dispensed, rather than the actual potable beverage. The use of the simulated beverage avoids the problems associated with cleaning and filling the display bowl and arising from the low dispensing capacity of the display bowls. Stratton discloses that the fluid is sterile, colored to simulate the beverage, and preferably includes a stable formulation that is a solvent for reactive dyes, such as urethane colorants. Stratton teaches that a preferred fluid is an alcohol, such as propylene glycol, and that a preferred colorant in the formulation includes a polymeric dye soluble in a polyol, e.g., a polyol having a chromogen chemically bound to a polymer. The formulation optionally includes a dispersoid, such as an alkenyl modified oxyalkylene polymer. Stratton fails, however, to describe how to simulate frozen beverages, i.e. beverages that contain ice crystals. It would be advantageous to provide fluid mixtures simulating the appearance of frozen beverages, such as granitas, slushes, and margaritas, particularly in display containers from which it appears that a frozen beverage is immediately available for consumption.

It is therefore an object of the present invention to provide stable compositions that simulate the appearance of a potable frozen beverage.

It is a further object of the present invention to provide a composition appearing to have the color, viscosity, and ice crystals present in a potable frozen beverage, wherein the composition is resistant to degradation and bacterial growth.

It is another object of the present invention to provide a method of manufacturing such simulated frozen beverage compositions.

These and other objects, features, and advantages of the present invention will become apparent upon review of the following detailed description of the invention when taken in conjunction with the drawings and the appended claims.

SUMMARY OF THE INVENTION

A stable composition is provided for simulating the appearance of a frozen beverage, such as fruit drink slushes and frozen coffees/teas. The composition includes a carrier fluid which comprises water, a thickening agent, and a colorant; and simulated ice crystals stably and uniformly dispersed in the carrier fluid. The simulated ice crystals are comprised of particles having a size preferably between about 200 and about 400 microns. The thickening agent preferably comprises a slurry of propylene glycol alginate dispersed in propylene glycol. The colorant is selected based on the "flavor" being simulated, for example, yellow for lemonade, and caramel color for coffee or cola. The particles preferably comprise a polymer such as high density polyethylene.

Methods of making the compositions are also provided. In a preferred embodiment, the method includes the steps of (a) dissolving a colorant in water to form an aqueous coloring solution; (b) adding the aqueous coloring solution to a thickening agent under mixing conditions to form a uniform carrier fluid; and (c) dispersing particles of simulated ice crystals into the carrier fluid under mixing conditions to form the composition, wherein the simulated ice crystals are stably and uniformly dispersed throughout the carrier fluid.

An apparatus for using the compositions also is provided. In a preferred embodiment, the apparatus includes a post-mix beverage dispenser having at least one discharge outlet, and a transparent display containing a quantity of the composition, wherein the display is positioned relative to the beverage dispenser to create the visual impression that the display is the principal source of frozen beverage discharged from the discharge outlet of the dispenser. Where the transparent display comprises a transparent container made of polycarbonate, the polymeric particles preferably are made of a softer polymer, such as a high density polyethylene. The apparatus is useful in a method of advertising the sale of frozen beverages (carbonated, non-carbonated, or both) at a point of purchase, by displaying a quantity of the composition in the transparent display at the point of purchase.

DETAILED DESCRIPTION OF THE INVENTION

Figure 1:
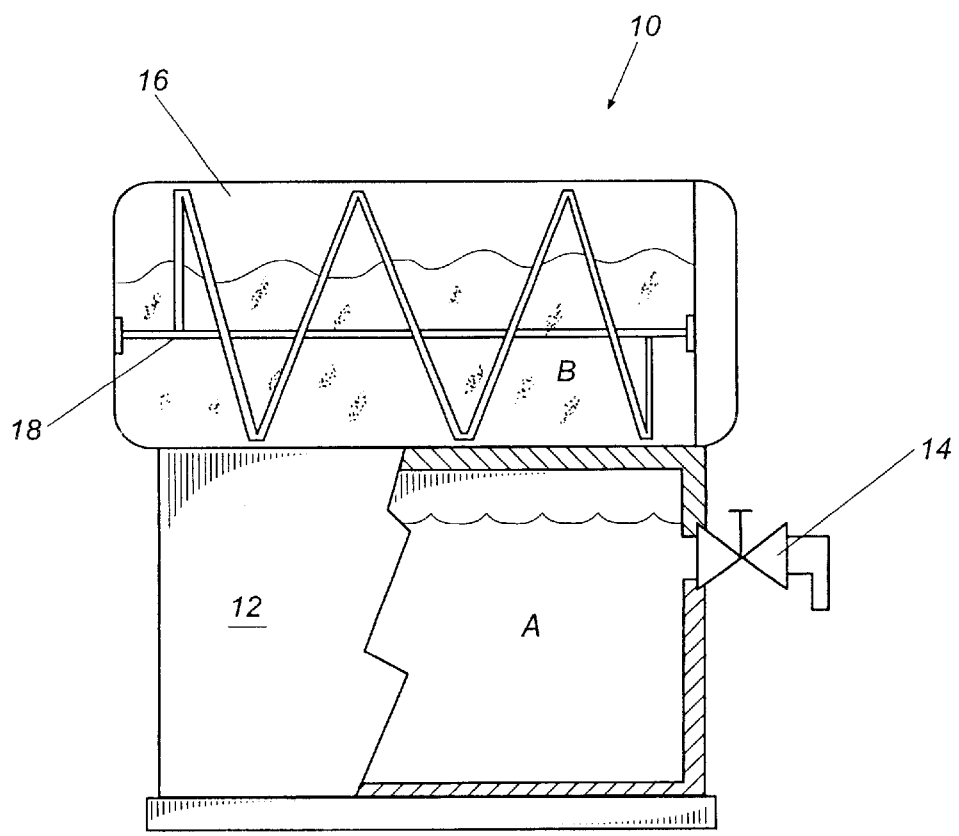
FIG. 1 is a diagram, in a side and partial cross-sectional view, of a typical frozen beverage dispenser including an integrated transparent display bowl suitable for displaying the simulated frozen beverage composition described herein.

A composition has been developed to simulate the appearance of frozen beverages. The compositions can be adapted to have the color and consistency of a variety of frozen beverages types and "flavors".

The Composition

The composition for simulating the appearance of a frozen beverage includes a carrier fluid in which simulated ice crystals are stably and uniformly dispersed. This composition is also referred to herein as a "simulated frozen beverage composition" or "SFB composition."

Carrier Fluid

The carrier fluid comprises water, a thickening agent, and a colorant. Other components such as anti-microbial agents can be included as needed for particular applications. The carrier fluid functions to primarily resemble the liquid portion of a frozen beverage, for example, the syrupy portion of "slushee"-type beverage.

The carrier fluid preferably is stable, i.e. will not degrade over time, and will not react with other components of the SFB composition or any components of a merchandising display container. The carrier fluid components should be selected to be a non-solvent for the simulated ice crystals. The components of the carrier fluid preferably are USP Grade.

In preferred embodiments, water composes between about 45 and 60% by weight of SFB composition.

Thickening Agent

As used herein, the term "thickening agent" includes viscous liquids and thickeners. The term refers to any material, or combination of materials, that can be combined with water to produce a solution, colloidal solution, emulsion or slurry having a viscosity and density effective to stabilize a suspension of polymeric particles dispersed throughout said solution, colloidal solution, emulsion or slurry. The term "stabilize" refers to a suspension that will not separate, for example, where the simulated ice crystals (e.g., polymeric particles) do not, upon cessation of agitation, form a separate layer from the carrier fluid.

In preferred embodiments, the thickening agent is a slurry of a viscous liquid, such as propylene glycol, glycerol, or a combination thereof, in which a thickener such as propylene glycol alginate is dispersed. In a most preferred embodiment, the thickening agent consists essentially of propylene glycol and propylene glycol alginate. In a preferred embodiment, at least about 20% by weight of the SFB composition is propylene glycol in order to inhibit or prevent microbial infection and/or growth.

Representative examples of other suitable thickening agents that may be used include carrageenan, xanthans and xanthanates, arabic gum, starch (modified or unmodified), sugars, alginic acid and alginates, and food grade polymeric materials (e.g., modified cellulose, polyvinylpyrrolidone). Other examples of suitable viscous liquid type thickening agents include sugar syrups (polyol solutions). In the case of sugar syrups, the carrier liquid preferably is water suitably preserved against yeast and mold infection and/or growth.

Preferably, the kinematic viscosity (ratio of mixture viscosity to mixture density) of the mixture is not less than 1990 cSt (centistokes) at 25° C. In a preferred embodiment, the mixture density is about 0.9820 g/cc. Depending upon the specific application, one can use a higher viscosity for static systems to inhibit component separation and a lower limit, e.g., 1990 cSt, for intermittent or continuous agitation systems.

Colorants

Colorants provide the "flavor type" associated with different frozen beverages. For example, red connotes strawberry, cherry, or punch flavors; purple connotes grape; yellow connotes lemonade, banana or pineapple; and various shades of brown suggest cola, espresso, tea, or coffee. The colorants preferably are of the type approved for food use, in order to minimize or eliminate hazards associated with inadvertent ingestion of the simulated product.

Essentially any known coloring agent, dye, or pigment that can be uniformly dissolved in the water or the thickening agent of the carrier fluid can be used as the colorant. Preferably the colorant is water soluble. Representative examples of suitable colorants include FD&C Red 40, FD&C Yellow 5, FD&C Yellow 6, FD&C Blue 1, FD&C Green 1, caramels and other natural pigments such as annatto and turmeric, and combinations thereof. These types of colorants are further described in 21 of the U.S. Code of Federal Regulations.

It should be noted that the FD&C dyes do not readily blend with propylene glycol and require the use of a quantity of water to pre-dissolve the dyes. If an inadequate amount of water is used, separation of the dye as crystals could occur, causing the formation of a haze in an otherwise (preferably) clear composition.

Other Agents

The carrier fluid can further include other agents as needed. Examples of these other agents include viscosity modifying agents, binding agents, dispersants, and anti-microbial agents. If sugar syrups, glycerols, starches, or natural gums are used as thickening agents, then anti-microbial agents preferably are included. Examples of these anti-microbial agents include benzoic acid and derivatives thereof (to guard against yeast) and sorbic acid and derivatives thereof (to guard against mold). If at least 20% by weight of propylene glycol is used in the SFB composition, then additional anti-microbial agents typically would not be required.

Simulated Ice Crystals

The simulated ice crystals must be substantially insoluble in the carrier fluid, and preferably compose between about 15 and 35% by weight of the SFB composition. The simulated ice crystals are comprised of particles having a size preferably between about 200 and about 400 microns, in their longest dimension. The particles more preferably have a size between about 210 and 300 microns.

The particles preferably are polymeric. The polymeric particles preferably comprise a polymer selected from the group consisting of polyolefins, polycarbonates, polyesters, nylons, and combinations thereof. Examples of suitable polyolefins include polyethylene, polypropylene, polyisoprene, polystyrene, poly(vinyl chloride), and poly(methylmethacrylate). In a preferred embodiment, the polymer is a high density polyethylene.

While not generally preferred, the particles can be made from non-polymeric materials. For example, bleached white wood or leaves ground to the specified diameter also can be used. In these embodiments, anti-oxidants preferably are included to inhibit browning of the wood or leaves. Examples of suitable anti-oxidant materials include ascorbic acid, erythorbic acid, and propyl gallate.

It is important to provide particles that are softer than the material of construction of the display container in which the SFB composition will be displayed, particularly when the SFB composition will be continuously agitated. Otherwise, the continuous movement of particles against the display container over time will result in scratching of the display container. This scratching eventually can render the display container cloudy or dirty looking, which is visually unappealing and interferes with a potential customer's view of the simulated frozen beverage. Where glass display containers are used, one may select essentially any material for forming the simulated ice crystals. In many modern displays, the display container is formed of a polymer, such as polycarbonate. As most polycarbonates would be scratched by polystyrene particles, it is preferred to use a softer polymer such as polyethylene in contact with polycarbonate.

The particles also can include one or more additives to improve various properties of the particles, such as to enhance particle formation and/or mechanical or chemical stability of the particles, or to alter one or more physical properties of the particles, such as density or surface characteristics. Bulking agents and/or lubricating agents also can be incorporated into the particles.

The simulated ice crystals preferably are formed from materials that comply with FDA regulations for food contact applications.

Methods of Making the Compositions

The method of making the SFB composition is not trivial. The order of mixing is critical to obtaining a stable, smooth, uniform composition. In a preferred embodiment, the method includes the steps of (a) dissolving a colorant in water to form an aqueous coloring solution; (b) adding the aqueous coloring solution to a thickening agent under mixing conditions to form a uniform carrier fluid; and (c)

dispersing particles of simulated ice crystals into the carrier fluid under mixing conditions to form the composition, wherein the simulated ice crystals are stably and uniformly dispersed throughout the carrier fluid. Preferably, before step (b), the thickening agent is prepared as a uniform slurry by dispersing a thickener in a viscous liquid.

The term "under mixing conditions" refers to the use of mixing equipment, such as dynamic and static mixers, pumps, or other devices known in the art for combining a first non-gas fluid material with a second non-gas fluid material.

Typically, the method will be performed using a batch process, although the method can be readily adapted to a continuous or semi-continuous process.

In a preferred method of producing the simulated ice crystals, commercially available polymers in a solid form are mechanically ground to yield particles. The ground particles are then classified (i.e. separated by size) in order to separate and obtain the particles having the desired size from the oversized and undersized particles. The grinding and classifying processes can be performed using equipment and methods known in the art.

Methods of Using the Compositions

The compositions can be used to simulate a wide variety of frozen beverages. Examples of such beverages include slush cocktails, such as margaritas, icees, specialty frozen espresso drinks, sorbets, and granita.

The composition typically is displayed in a transparent tank or bowl (which is referred to herein as a display container), preferably maintained only partially (e.g., three-quarters) full. The display container optionally is equipped with a mechanism to stir the composition, for example, which includes a scraper that scrapes the SFB composition from the sides of the display container. The display container should be sealed following filling with the SFB composition, so as to avoid evaporation, contamination, or leakage. The display container also should be lightweight and durable. In a preferred embodiment, the display container is made of polycarbonate.

The display container preferably is mounted onto an actual frozen beverage dispenser, preferably in a manner such that the arrangement creates the visual impression that the display container is the reservoir and source of the dispensed beverage. FIG. 1 illustrates one embodiment of such an apparatus. The apparatus 10 includes a beverage dispenser 12 having discharge outlet 14, and a transparent display container 16 containing mixer/scrapper 18. A quantity of simulated frozen beverage composition B is displayed the transparent display container 16, while the actual frozen beverage A is stored and dispensed from beverage dispenser 12. The transparent display container 12 is not in fluid connection with the actual frozen beverage dispenser 16. Frozen beverage dispensers are known in the art. Representative examples include the 4-Barrel Cornelius, ICEE, and countertop FUB.

The SFB compositions described herein are useful in a method of advertising the sale of a frozen beverage at a point of purchase. The frozen beverage can be carbonated or non-carbonated. The method comprises (a) displaying a quantity of the SFB composition in a transparent display at the point of purchase, such that the composition simulates the frozen beverage to be sold. The method is particularly useful where the transparent display is positioned relative to a beverage dispenser to create the visual impression that the transparent display is the principal source of frozen beverage discharged from a discharge outlet of the dispenser.

The present invention can be further understood with reference to the following non-limiting examples.

EXAMPLE 1

Simulated Frozen Uncarbonated Coffee Beverage

A one quart batch of simulated frozen uncarbonated coffee beverage was prepared. First, the following ingredients and amounts were obtained and weighed:

(a). 564 g of water;
(b). 188 g of propylene glycol (USP Grade, from Alchem Chemical Co., Atlanta, Ga.);
(c). 170 g of polyethylene (Dow HDPE 08454, FDA approved for food contact, Ashland Distribution General Polymers, Dublin, Ohio), ground 50 to 70 U.S. mesh (All Grind Plastics, West Portal, N.J.);
(d). 6.1 g of propylene glycol alginate (USP Grade, KELCOLOID™ HVF from ISP Alginates, Inc., San Diego, Calif.); and
(e). 2.2 g of caramel colorant double strength (USP Grade, Caramel CCDS from Sethness Products Co., Clinton, Iowa).

The simulated beverage composition was prepared by combining the ingredients as follows, under appropriate ventilation conditions. The caramel colorant was added to a 1 L beaker, and then the water was added into the beaker and mixed thoroughly to completely dissolve the colorant, forming a water/caramel solution.

Next, the propylene glycol was added to a 2 L beaker. The propylene glycol alginate was then added to the 2 L beaker to form a slurry. The slurry was mixed well to disperse any lumps.

While agitating the slurry, the water/caramel solution was added continuously, in one motion. The slurry and water/caramel solution was further agitated until a smooth, thick blend was formed. Next, the polyethylene was added to the blend and mixing continued until a smooth uniform mixture was obtained. The mixture resembled a coffee-flavored frozen beverage.

EXAMPLE 2

Simulated Frozen Uncarbonated Lemonade Beverage

A one quart batch of simulated frozen uncarbonated lemonade beverage was prepared. First, the following ingredients and amounts were obtained and weighed:

(a). 570 g of water;
(b). 188 g of propylene glycol (USP Grade, from Alchem Chemical Co., Atlanta, Ga.);
(c). 170 g of polyethylene (Dow HDPE 08454, FDA approved for food contact, Ashland Distribution General Polymers, Dublin, Ohio), ground 50 to 70 U.S. mesh (All Grind Plastics, West Portal, N.J.);
(d). 6.8 g of propylene glycol alginate (USP Grade, KELCOLOID™ HVF from ISP Alginates, Inc., San Diego, Calif.); and
(e). 4.7 g of 0.100% FD&C Yellow 5 colorant in water (USP Grade, tartrazine yellow from Warner-Jenkinson Co., St. Louis, Mo.).

The simulated beverage composition was prepared by combining the ingredients as follows, under appropriate ventilation conditions. The Yellow 5 colorant was added to a 1 L beaker, and then the water was added into the beaker and mixed thoroughly to completely dissolve the colorant, forming a water/Yellow 5 solution.

Next, the propylene glycol was added to a 2 L beaker. The propylene glycol alginate was then added to the 2 L beaker to form a slurry. The slurry was mixed well to disperse any lumps.

While agitating the slurry, the water/Yellow 5 solution was added continuously, in one motion. The slurry and water/Yellow 5 solution was further agitated until a smooth, thick blend was formed. Next, the polyethylene was added to the blend and mixing continued until a smooth uniform mixture was obtained. The mixture resembled a lemonade-flavored frozen beverage.

Those skilled in the art will recognize, or be able to ascertain using no more than routine experimentation, many equivalents to the specific embodiments of the invention described herein. The references cited herein are hereby incorporated by reference.

We claim:

1. A stable composition for simulating the appearance of a frozen beverage, comprising;
    a carrier fluid which comprises water, a thickening agent, and a colorant; and
    simulated ice crystals stably and uniformly dispersed in the carrier fluid, the simulated ice crystal being comprised of particles having a size between about 200 and about 400 microns.

2. The composition of claim 1, wherein the thickening agent comprises propylene glycol, glycerol, propylene glycol alginate, or a combination thereof.

3. The composition of claim 2, wherein the thickening agent consists essentially of propylene glycol and propylene glycol alginate.

4. The composition of claim 1, wherein the colorant is selected from the group consisting of caramel coloring and FD&C Yellow 5.

5. The composition of claim 1, wherein the particles are polymeric.

6. The composition of claim 5, wherein the polymeric particles comprise a polymer selected from the group consisting of polyolefins, polycarbonates, polyesters, nylons, and combinations thereof.

7. The composition of claim 6, wherein the polyolefin is selected from the group consisting of polyethylene, polypropylene, polyisoprene, polystyrene, poly(vinyl chloride), and poly(methylmethacrylate).

8. The composition of claim 7, wherein the polymer comprises high density polyethylene.

9. The composition of claim 1, wherein the particles have a size between about 210 and 300 microns.

10. The composition of claim 1, wherein the colorant comprises a food dye.

11. The composition of claim 1, wherein the kinematic viscosity of the composition is at least about 1990 centistokes.

12. The composition of claim 1, wherein the simulated ice crystals are between about 15 and 35% by weight of the composition.

13. The composition of claim 1, wherein the thickening agent comprises propylene glycol and propylene glycol alginate, the particles comprise high density polyethylene, and colorant comprises a food dye dissolved in water.

14. An apparatus comprising:
    a post-mix beverage dispenser having at least one discharge outlet, and
    a transparent display containing a quantity of the composition of claim 1, wherein the display is positioned relative to the beverage dispenser to create the visual impression that the display is the principal source of frozen beverage discharged from the discharge outlet of the dispenser.

15. The apparatus of claim 14, wherein the transparent display comprising a transparent container formed from polycarbonate, and the polymeric particles comprise a high density polyethylene.

16. The apparatus of claim 14, further comprising a scraper that moves the composition within the display container.

17. A method of making a stable composition for simulating the appearance of a frozen beverage, the method comprising:
    (a) dissolving a colorant in water to form an aqueous coloring solution;
    (b) adding the aqueous coloring solution to a thickening agent under mixing conditions to form a uniform carrier fluid; and
    (c) dispersing particles of simulated ice crystals into the carrier fluid under mixing conditions to form the composition, wherein the simulated ice crystals are comprised of particles having a size between about 200 and about 400 microns, which are stably and uniformly dispersed throughout the carrier fluid.

18. The method of claim 17 wherein, before step (b), the thickening agent is a slurry prepared by dispersing propylene glycol in either glycerol or propylene glycol.

19. A method of advertising the sale of a frozen beverage at a point of purchase, the method comprising:
    displaying a quantity of a composition in a transparent display at the point of purchase, the composition comprising a carrier fluid which comprises water, a thickening agent, and a colorant, and simulated ice crystals stably and uniformly dispersed in the carrier fluid, the simulated ice crystals being comprised of particles having a size between about 200 and about 400 microns,
    wherein the composition simulates the non-carbonated frozen beverage to be sold.

20. The method of claim 19, wherein the transparent display is positioned relative to a beverage dispenser to create the visual impression that the transparent display is the principal source of frozen beverage discharged from a discharge outlet of the dispenser.

21. The method of claim 19, wherein the frozen beverage is non-carbonated.

* * * * *